(12) United States Patent
Lei et al.

(10) Patent No.: US 11,036,948 B2
(45) Date of Patent: Jun. 15, 2021

(54) BARCODE-SCANNING SYSTEM CONFIGURED FOR BOTH DATA VALIDATION AND DATA FORMATTING

(71) Applicant: The Code Corporation, Draper, UT (US)

(72) Inventors: Ming Lei, Princeton Junction, NJ (US); Jason Lee, Concord, MA (US)

(73) Assignee: The Code Corporation, Murray, UT (US)

( * ) Notice: Subject to any disclaimer, the term of this patent is extended or adjusted under 35 U.S.C. 154(b) by 0 days.

(21) Appl. No.: 16/247,979

(22) Filed: Jan. 15, 2019

(65) Prior Publication Data

US 2019/0220639 A1 Jul. 18, 2019

Related U.S. Application Data

(60) Provisional application No. 62/617,365, filed on Jan. 15, 2018.

(51) Int. Cl.
*G06K 7/10* (2006.01)
*G06K 9/22* (2006.01)
*G06K 19/06* (2006.01)
*G06K 7/14* (2006.01)

(52) U.S. Cl.
CPC ..... *G06K 7/1413* (2013.01); *G06K 19/06028* (2013.01); *G06K 7/10722* (2013.01)

(58) Field of Classification Search
USPC ....................................... 235/462.01, 462.25
See application file for complete search history.

(56) References Cited

U.S. PATENT DOCUMENTS

| 6,263,383 | B1 * | 7/2001 | Lee | ......................... | G06F 3/023 |
| | | | | | 709/218 |
| 6,305,606 | B1 * | 10/2001 | Brunelli | ................... | G06K 7/14 |
| | | | | | 235/462.16 |
| 9,135,485 | B1 * | 9/2015 | Ashby | ................ | G06K 7/10821 |
| 9,213,878 | B1 * | 12/2015 | Ashby | ................ | G06K 7/10821 |
| 2017/0372289 | A1 * | 12/2017 | Fitzsimmons | .......... | H04W 4/80 |

* cited by examiner

*Primary Examiner* — Tuyen K Vo
(74) *Attorney, Agent, or Firm* — Timothy P. O'Hagan; Ray Quinney & Nebeker (57) ABSTRACT

This disclosure concerns a barcode reading system that includes a barcode reader and a data manipulation module. The barcode reader reads a barcode, decodes the barcode, and generates decoded data. The data manipulation module includes a data validation module and a data formatting module. The data validation module can perform one or more data validation operations on the decoded data. The data formatting module is separate from the data validation module. The data formatting module can perform one or more data formatting operations on either an output of the data validation module or on the decoded data. The output of the data validation module may include one or more data validation modifications. The barcode reading system may also include a host computer that is in electronic communication with the barcode reader. In some configurations, the barcode reader may include the data manipulation module. In other configurations, the host computer may include the data manipulation.

20 Claims, 6 Drawing Sheets

BARCODE-SCANNING SYSTEM CONFIGURED FOR BOTH DATA VALIDATION AND DATA FORMATTING

CROSS-REFERENCE TO RELATED APPLICATIONS

This application claims priority to U.S. Provisional Patent Application Ser. No. 62/617,365, filed on Jan. 15, 2018, titled "BARCODE-SCANNING SYSTEM CONFIGURED FOR BOTH DATA VALIDATION AND DATA FORMATTING". The foregoing patent application is hereby incorporated by reference in its entirety.

BACKGROUND

A barcode is an optical machine-readable representation of information. Devices for identifying or extracting information from barcodes are generally referred to as barcode readers. Image-based barcode readers operate by capturing and decoding images of barcodes. In typical operation, one or more light sources are activated to illuminate a region of space that includes a barcode. Light is reflected from the barcode toward the barcode reader. One or more lenses within the barcode reader focus an image of the barcode onto an image sensor, which is a two-dimensional array of photosensors (i.e., detectors that are sensitive to electromagnetic radiation). The photosensors are read electronically to provide a two-dimensional array of image data corresponding to the barcode. A decoder processes the signal from the photodetector and extracts the information contained in the barcode (e.g. decoded data). Barcodes and barcode readers are used a wide-variety of industries, such as retail, healthcare, and shipping.

SUMMARY

In accordance with one or more embodiments, there is provided a barcode reading system. The barcode reading system may include a barcode reader configured to read and decode a barcode to generate decoded data. The barcode reading system further includes a data manipulation module. The data manipulation module may include a data validation module and a data formatting module. The data validation module may be capable of performing one or more data validation operations on the decoded data. The data formatting module may be separate from the data validation module and may be capable of performing one or more data formatting operations on either an output of the data validation module or on the decoded data.

In one or more embodiments, the data manipulation module is configured to perform any of: (i) data validation followed by data formatting; or (ii) data validation without data formatting; or (iii) data formatting without data validation.

In one or more embodiments, the one or more data validation operations include at least one of: determining whether the decoded data complies with an industry standard; determining whether the decoded data complies with one or more application requirements; parsing the decoded data in order to identify one or more fields contained therein; extracting information from the decoded data based on defined rules; or matching a string of characters in the decoded data to a defined pattern.

In certain embodiments, the industry standard is at least one of: a GS1 standard; a Unique Device Identification standard; an International Organization for Standardization standard; or an American Association of Motor Vehicle Administrators standard.

In one or more embodiments, the output of the data validation module includes one or more data validation modifications.

In one or more embodiments, the one or more data formatting operations comprise at least one of: deleting one or more characters from the decoded data; adding one or more additional characters to the decoded data; changing the decoded data to a different type of numeral system; or changing at least some characters in the decoded data to a different letter case.

In one or more embodiments, the barcode reader includes the data manipulation module.

In one or more embodiments, the barcode reading system further includes a host computer that is in electronic communication with the barcode reader; and the host computer includes the data manipulation module.

In one or more embodiments, the data manipulation module can output modified decoded data that includes less than all the decoded data and at least one additional character.

In accordance with one or more embodiments of the present disclosure, a method is disclosed. The method includes reading and decoding a barcode to generate decoded data; providing the decoded data to a data validation module; validating, with the data validation module, the decoded data to produce validated decoded data; providing the validated decoded data to a data formatting module, wherein the data formatting module is capable of formatting the decoded data; and formatting, with the data formatting module, the validated decoded data to produce modified decoded data.

In one or more embodiments, validating, with the data validation module, the decoded data includes at least one of the following: determining whether the decoded data complies with an industry standard; determining whether the decoded data complies with one or more application requirements; parsing the decoded data in order to identify one or more fields contained therein; extracting information from the decoded data based on defined rules; or matching a string of characters in the decoded data to a defined pattern.

In one or more embodiments, formatting, with the data formatting module, the validated decoded data includes at least one of: deleting one or more characters from the decoded data; adding one or more additional characters to the decoded data; changing the decoded data to a different type of numeral system; or changing at least some characters in the decoded data to a different letter case.

In one or more embodiments, the method further includes providing the modified decoded data to a host computer.

In one or more embodiments, the modified decoded data comprises less than all the decoded data and at least one additional character.

In accordance with one or more embodiments of the present disclosure, a barcode manipulation module is disclosed. The barcode manipulation module includes a data validation module that can perform one or more data validation operations on decoded data generated from decoding a barcode. The barcode manipulation module further includes a data formatting module separate from the data validation module. The data formatting module can perform one or more data formatting operations on either an output of the data validation module or on the decoded data.

In one or more embodiments, the data manipulation module can perform any of: (i) data validation followed by data formatting; or (ii) data validation without data formatting; or (iii) data formatting without data validation.

In one or more embodiments, the one or more data validation operations include at least one of: determining whether the decoded data complies with an industry standard; determining whether the decoded data complies with one or more application requirements; parsing the decoded data in order to identify one or more fields contained therein; extracting information from the decoded data based on defined rules; or matching a string of characters in the decoded data to a defined pattern.

In one or more embodiments, the industry standard is at least one of: a GS1 standard; a Unique Device Identification standard; an International Organization for Standardization standard; or an American Association of Motor Vehicle Administrators standard.

In one or more embodiments, the output of the data validation module includes one or more data validation modifications.

In one or more embodiments, the one or more data formatting operations include at least one of: deleting one or more characters from the decoded data; adding one or more additional characters to the decoded data; changing the decoded data to a different type of numeral system; or changing at least some characters in the decoded data to a different letter case.

BRIEF DESCRIPTION OF THE DRAWINGS

To more fully describe the above-recited and other features of the disclosure a more particular description is provided with reference to specific embodiments, which are illustrated in the appended drawings. Like elements have been designated by like reference numbers in the accompanying figures.

DETAILED DESCRIPTION

A barcode reader may be used to read a barcode and generate decoded data. The decoded data may represent information contained in the barcode. In some circumstances, the barcode reader may perform data formatting operations on the decoded data that may result in modified decoded data. The modified decoded data may include data formatting modifications. In other circumstances, the barcode reader may perform data validation operations on the decoded data that may result in validated decoded data. The validated decoded data may include data validation modifications. Typical barcode readers customize data formatting operations to particular data validation operations. Tailoring data formatting operations to particular data validation operations means that those data formatting operations cannot be also applied directly to decoded data.

The present disclosure is directed to a barcode scanning system capable of performing data formatting on either (1) decoded data or (2) decoded data with data-validation modifications. Thus, in accordance with the present disclosure, instead of embedding limited functionality of data formatting into various data parsing/validation configurations, a data formatting module can format either decoded data outputted directly from a barcode decoder or modified decoded data outputted from a data validation module. This makes the formatting of validated output more powerful and flexible, without adding complexity to the configuration for data parsing/validation.

Figure 1:
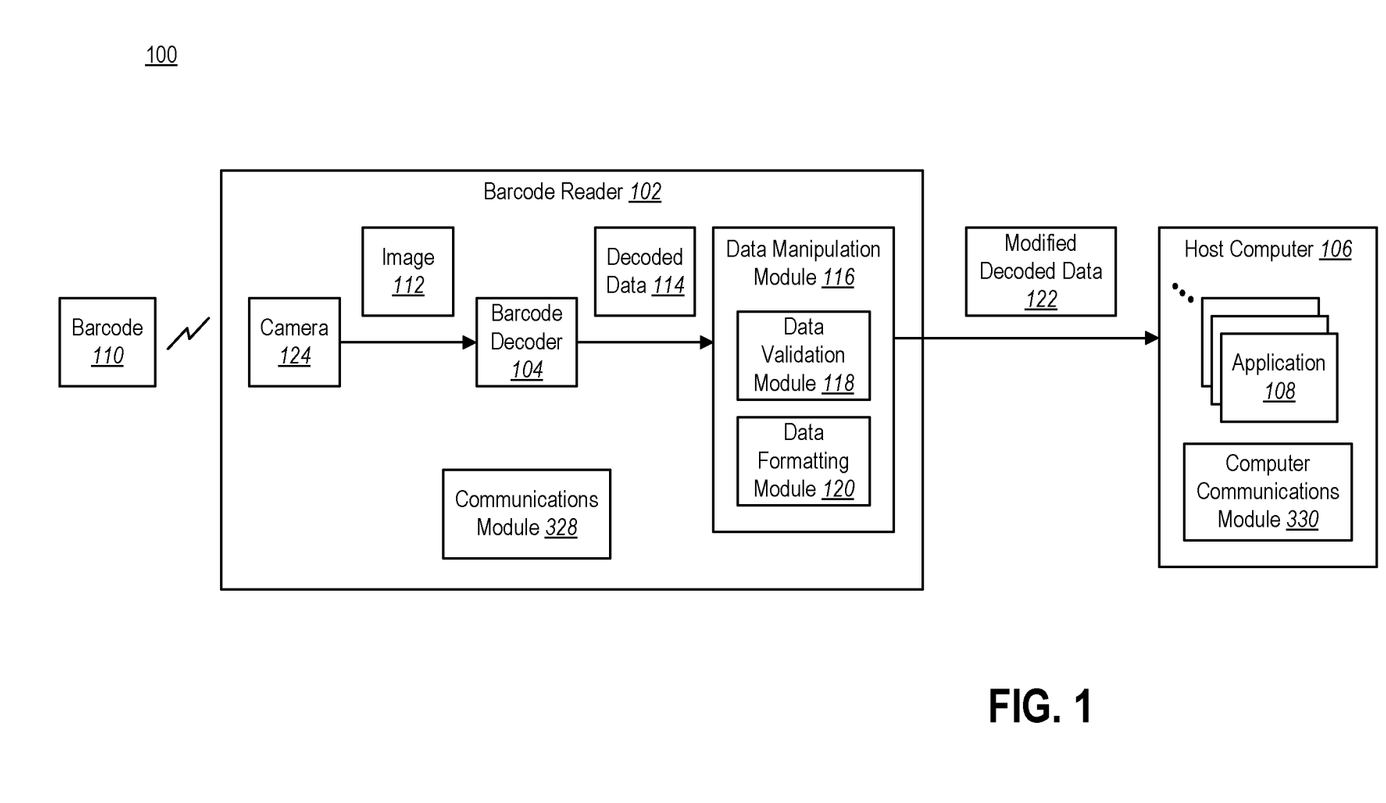
FIG. 1 illustrates an example barcode-reading system that includes an example data manipulation module.

As shown in FIG. 1, a barcode reading system 100 may include a barcode reader 102, a barcode decoder 104, and a host computer 106 running one or more applications 108.

The barcode reader 102 may be designed to scan a barcode 110. A camera 124 within the barcode reader 102 may capture an image 112 of the barcode 110, and the barcode decoder 104 may process the image 112 to produce decoded data 114. The decoded data 114 may be any form of data that represents information contained in the barcode 110. For example, the decoded data 114 may be a numeric, alphabetic, or alphanumeric string of characters. The barcode decoder 104 may produce decoded data 114 according to predefined criteria. The decoded data 114 may be provided to the host computer 106 and used by one or more applications 108 running on the host computer 106. The barcode reader 102 may provide the decoded data 114 to the host computer 106 using a communications module 328. The communications module 328 may also be configured to receive communications from the host computer 106. The host computer 106 may receive the decoded data 114 through a computer communications module 330. The host computer 106 may also send communications to the barcode reader 102 using the computer communications module 330.

The barcode reader 102 is shown with a data manipulation module 116, which may be configured to perform one or more operations on the decoded data 114 before the decoded data 114 is transmitted to the host computer 106. Although the communications module 328 shown in FIG. 1 is separate from the data manipulation module 116, in other designs, the communications module 328 may be included in the data manipulation module 116.

The data manipulation module 116 may be designed to perform a wide variety of operations.

For example, the data manipulation module 116 may be designed to validate one or more aspects of the decoded data 114. Validating one or more aspects of decoded data may be referred to as data validation. Data validation may include determining whether the decoded data 114 complies with one or more predefined requirements. For example, data validation may include determining whether the decoded data 114 complies with one or more industry standards, such as a GS1 standard, a Food and Drug Administration (FDA) Unique Device Identification (UDI) standard, an International Organization for Standardization (ISO) standard, or the like. This type of data validation may be referred to as syntax validation. Data validation may also include determining whether the decoded data 114 complies with one or more application requirements. Data validation may also include extracting information from the decoded data based on rules associated with industry standards and requirements. The host computer 106 may communicate requirements of the one or more applications 108 to the barcode reader 102. The barcode reader 102 may request this information from the host computer 106 or the host computer 106 may send this information to the barcode reader 102 without a request from the barcode reader. The host computer 106 may also communicate one or more industry standards to the barcode reader 102.

Data validation may include modifying the decoded data. For example, data validation may include modifying the decoded data 114 to indicate whether or not the decoded data 114 complies with one or more predefined requirements or standards. In situations where the decoded data 114 does not comply with a predefined requirement or standard, data validation may also include modifying the decoded data 114 to indicate in what way the decoded data 114 fails to comply with the predefined requirement or standard. In some designs, data validation may include rejecting decoded data that does not comply with one or more predefined requirements. In another example, data validation may include modifying the decoded data 114 by extracting only a portion of the decoded data 114 based on rules associated with industry standards and requirements or on rules associated with application requirements.

The data manipulation module 116 may be designed to perform data parsing. Data parsing may be performed separate from and independent of data validation or may be performed as part of the process of data validation. Data parsing may include one or more operations for identifying relevant subparts of the decoded data 114. For example, a barcode 110 may include a plurality of different fields. A field may be a particular type of information or category of information. A field may also be a particular area within a barcode 110 where a particular type of information is stored. When a barcode 110 is scanned, the resulting decoded data 114 may be parsed in order to identify the fields contained therein. For example, a barcode 110 that is located on a driver's license may include fields such as a person's name, address, street, zip code, and the like. It may be desirable to output these fields in a particular order, and/or to output only a subset of these fields. Parsing may be performed in order to facilitate such modifications. For example, if it is desirable to output only the first and last name, parsing may be performed in order to identify these fields within the decoded data 114.

Parsing may also include modifying the decoded data 114 to reorder fields contained in the decoded data 114 to be in a particular order. Parsing may also include modifying the decoded data 114 to include only a subset of the fields contained in the decoded data 114. Parsing may include modifying the decoded data 114 to indicate the beginning and end of a particular field or information associated with a particular field.

The data manipulation module 116 may be designed to perform matching. Matching may be performed separate from and independent of data validation or may be performed as part of the process of data validation. Matching may include matching one or more character strings. For example, matching may include verifying that the decoded data 114 includes a particular character string (or strings). A character string may include a single character, a number, or a set of alphanumeric and special characters. Matching may also include modifying the decoded data 114 to indicate whether or not a particular character string (or strings) is included in the decoded data. As another example, it may be desirable to find a particular character string (or strings) within the decoded data 114 and replace it with another character string (or strings). Matching may also include extracting from the decoded data 114 information based on the presence of a matching string or strings and particular rules. For example, a particular rule may be to extract the five characters following a matching string.

Data formatting is another example of an operation that the data manipulation module 116 may perform on the decoded data 114. Data formatting may include modifying the decoded data 114 in some way. For example, data formatting may include adding one or more characters to, or deleting one or more characters from, the decoded data 114. As another example, data formatting may include changing the decoded data 114 to a particular format (e.g., hexadecimal, uppercase, lowercase).

In the barcode reading system 100 shown in FIG. 1, the barcode decoder 104 and the data manipulation module 116 are shown as part of the barcode reader 102. In alternative embodiments, the barcode decoder 104 and the data manipulation module 116 may be separate from the barcode reader 102. For example, the barcode decoder 104 and/or the data manipulation module 116 may be located on the host computer 106 or on another computing device that is in electronic communication with the barcode reader 102 and the host computer 106.

Generally speaking, data validation and data formatting are different types of operations. In known barcode scanning systems, data validation and data formatting are mutually exclusive unless data formatting is specially configured to work with specific data validation operations. Thus, known barcode scanning systems do not have the flexibility to selectively choose whether to perform data formatting on either decoded data or on modified decoded data that may include one or more data validation modifications.

The data manipulation module 116 in the barcode reading system 100 shown in FIG. 1 includes both a data validation module 118 and a data formatting module 120. The data manipulation module 116 may be configured to receive decoded data 114 and perform both data validation (via the data validation module 118) and data formatting (via the data formatting module 120). Alternatively, the data manipulation module 116 may be configured to perform data validation (via the data validation module 118) without previously performing data formatting. As another alternative, the data manipulation module 116 may be configured to perform data formatting (via the data-formatting module 120) without previously performing data validation. After performing (i) data validation and data formatting, or (ii) data validation only (without data formatting), or (iii) data formatting only (without data validation), the data manipulation module 116 may output modified decoded data 122. The data manipulation module 116 may output the modified decoded data 122 to the host computer 106.

Figure 2A:
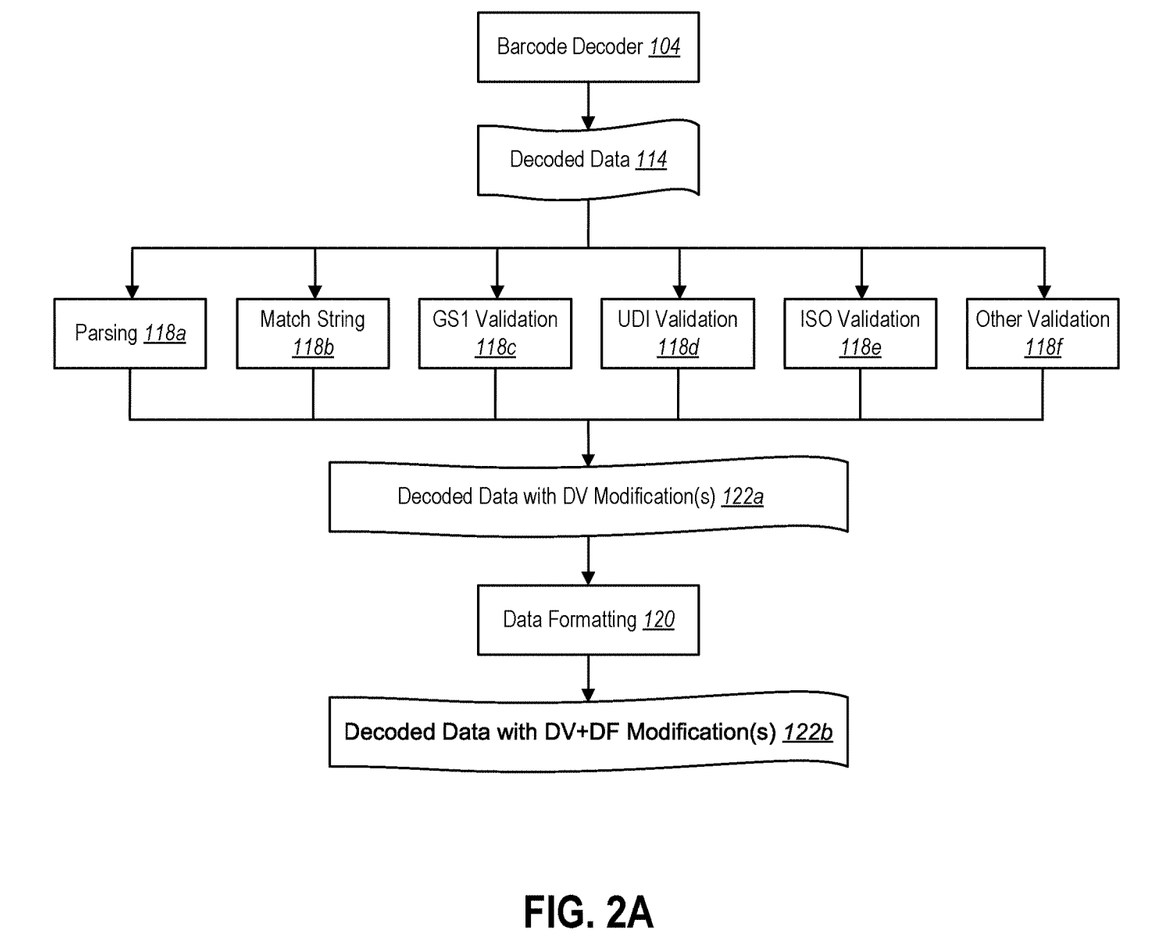
FIG. 2A illustrates an example of a data-manipulation module performing data validation and data formatting.
Figure 2B:
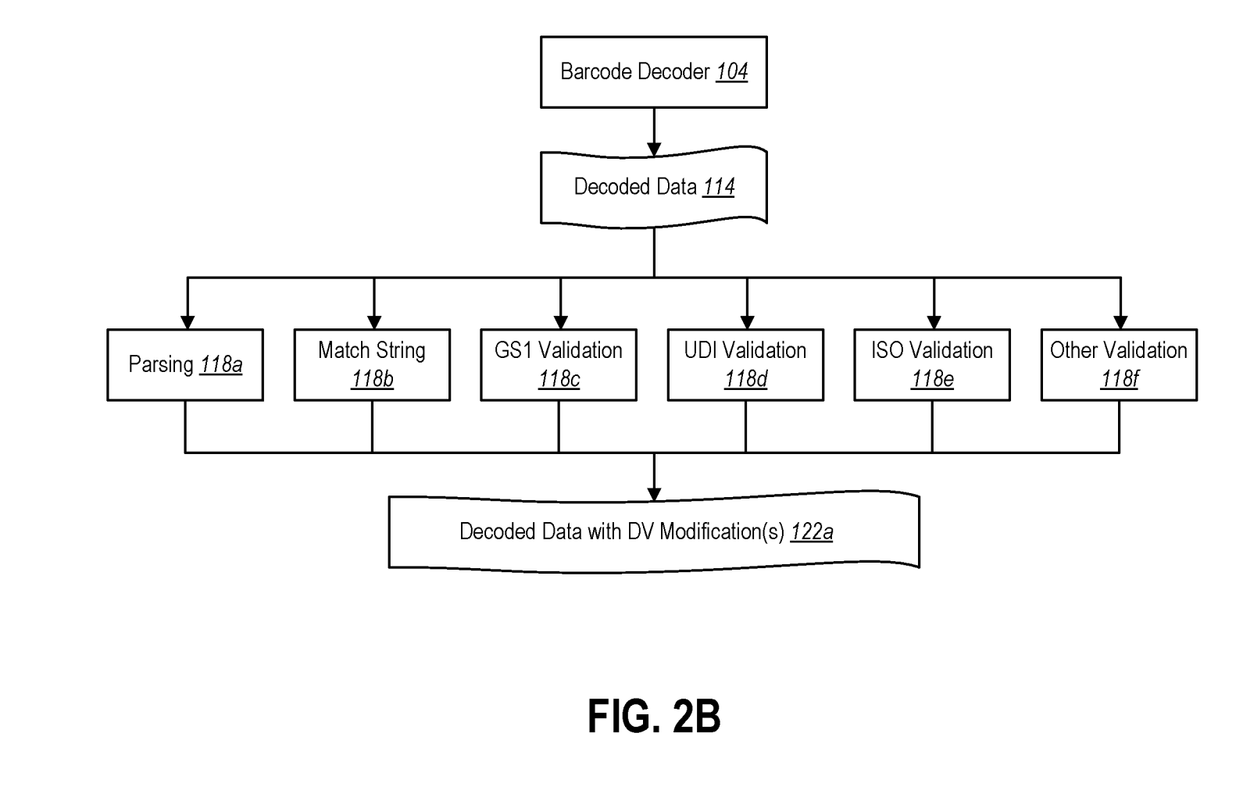
FIG. 2B illustrates an example of a data-manipulation module performing data validation but not data formatting
Figure 2C:
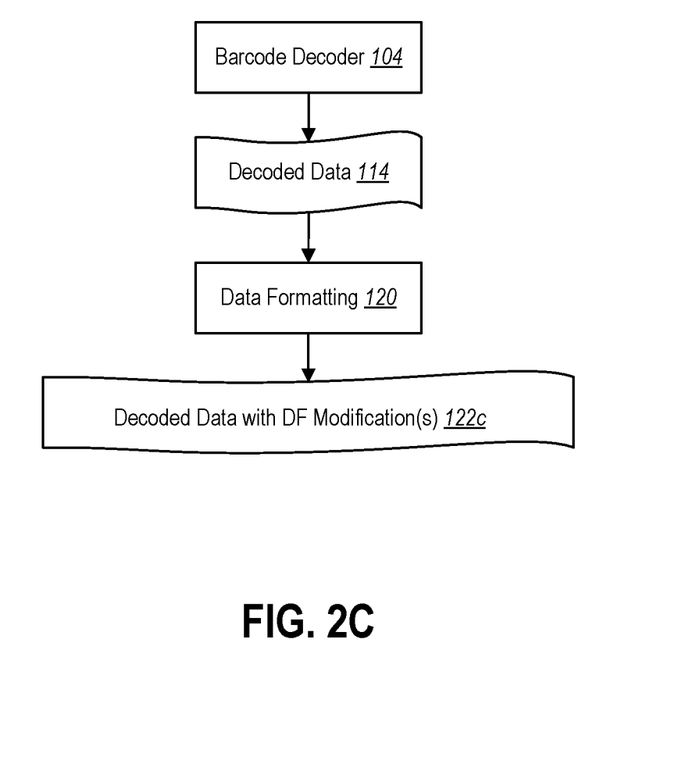
FIG. 2C illustrates an example of a data-manipulation module performing data formatting but not data validation.

FIGS. 2A-C illustrate three examples of how the data-manipulation module 116 may operate in accordance with some embodiments.

FIG. 2A illustrates an example of a scenario in which the data manipulation module 116 performs data validation and data formatting. A barcode decoder 104 produces decoded data 114. One or more of various data validation modules 118*a-f*, such as a parsing module 118*a*, a match-string module 118*b*, a GS1-validation module 118*c*, a UDI-validation module 118*d*, an ISO-validation module 118*e*, or another type of validation module 118*f*, may receive the decoded data 114. In certain designs, only one of the one or more data validation modules 118*a-f* processes the decoded data 114 and outputs modified decoded data 122*a*, which may include one or more data validation modifications. In other designs, two or more of the one or more data validation modules 118*a-f* process the decoded data 114 but only one of the one or more data validation modules 118*a-f* outputs the modified decoded data 122*a*. In other designs, two or more of the data validation modules 118*a-f* process the decoded data 114 and produce two or more sets of output data. The two or more sets of output data are then combined to produce the modified decoded data 122a. In other designs, two or more of the data validation modules 118a-f process the decoded data 114 and output data but only one output is selected as the modified decoded data 122a.

Although FIG. 2A shows the decoded data 114 being provided to the various data validation modules 118a-f in parallel, in other examples decoded data may be provided serially to two or more data validation modules. For example, the decoded data 114 may be provided to one of the modules 118c-f that verifies that the decoded data 114 complies with an applicable standard. Then, the decoded data 114 may be provided to the parsing module 118a in order to extract particular fields within the decoded data 114. In this particular example, only the parsing module 118a may make one or more data modifications to the decoded data 114 or, in the alternative, one of the modules 118c-f may also make at least one data validation modification to the decoded data 114.

The modified decoded data 122a may then be provided to a data formatting module 120. The data formatting module 120 may perform one or more data formatting operations and output modified decoded data 122b that includes one or more data validation modifications as well as one or more data formatting modifications. For example, the data formatting module 120 may add one or more additional characters to the modified decoded data 122a.

The modified decoded data 122b may then be output to the host computer 106. The one or more applications 108 may use the modified decoded data 122b.

FIG. 2B illustrates an example of a scenario in which the data manipulation module 116 performs data validation but not data formatting. The barcode decoder 104 produces decoded data 114, which may be provided to one of the various data-validation modules (the parsing module 118a, match-string module 118b, GS1-validation module 118c, UDI-validation module 118d, ISO-validation module 118e, or another type of validation module 118f). Whichever module processes the decoded data 114, that module may output modified decoded data 122a that may include one or more data validation modifications. In the depicted embodiment, this modified decoded data 122a with one or more data validation modifications is not provided to the data formatting module 120 (as shown in FIG. 2A). The modified decoded data 122a with one or more data validation modifications may be output to the host computer 106 without performing any data formatting on the modified decoded data 122a.

FIG. 2C illustrates one example of a scenario in which the data manipulation module 116 performs data formatting but not data validation. The barcode decoder 104 produces decoded data 114. In the depicted embodiment, the decoded data 114 is not provided to a data validation module. Instead, the decoded data 114 is provided directly to the data formatting module 120. The data formatting module 120 performs one or more data formatting operations and outputs modified decoded data 122c that includes one or more data formatting modifications. This modified decoded data 122c with one or more data formatting modifications may be output to the host computer 106.

In some embodiments, the data manipulation module 116 may be configured so that it does not perform data formatting prior to performing data validation. For example, as shown in FIG. 2A, the data manipulation module 116 may perform data validation followed by data formatting. Alternatively, as shown in FIG. 2B, the data manipulation module 116 may perform data validation without subsequently performing data formatting. Alternatively, as shown in FIG. 2C, the data manipulation module 116 may perform data formatting without previously performing data validation.

Thus, in accordance with the present disclosure, instead of embedding limited functionality of data formatting into various data parsing/validation configurations, the data formatting module 120 can be applied to either the decoded data 114 (unaltered output of the barcode decoder 104) or an output of the data validation module 118 (which includes various modules 118a-f, such as the parsing module 118a). This makes the formatting of the validated output more powerful and flexible, without adding complexity to the configuration for data parsing/validation.

Several examples of the techniques disclosed herein will now be described.

Example #1: Data Validation

Suppose that a barcode 110 located on a driver license is scanned and produces the following decoded data 114 (in general, there are about 50-100 data fields in a driver license):

@{0a}{1e}{0d}ANSI 6360100102DL00390168ZF02070074DLDAALICENSE, SAMPLE, DRIVER{0a}DAGNON IMMIGRANT{Ca}D AITEMPORARY{0a}DAJFL{Ca}DAK32399-6552 {0a}DAQL252784655542{0a}DARE {0a}DASNONE{0a}DATNONE{0a}DBA2C 141120{0a}DBB19650214{0a}DBC2{Ca}DBD20131120 {0a}DAU507{0d}ZFZFAREPLACED: 20131121{0a}ZFB{0a}ZFCQ0113 11210028{0a}ZFD{0a}ZFE09-01- 12{0a}ZFFTEMPORARY{0d}

Further suppose that the user wants to receive only the following fields: last name, first name, date of birth, license number, and expiration date. In this example, the data manipulation module 116 may first perform data validation 118f to verify that the decoded data 114 complies with an applicable standard (e.g., the American Association of Motor Vehicle Administrators standard). Next, the data manipulation module 116 may perform parsing 118a in order to identify the desired fields (last name, first name, date of birth, license number, and expiration date). The data manipulation module 116 may output modified decoded data 122a as follows:

| | |
|---|---|
| LICENSE | ←----- last name from DL sample |
| SAMPLE | ←----- first name |
| L252784655542 | ←---- license number |
| Feb. 14, 1965 | ←----- date of birth |
| Nov. 20, 2014 | ←----- license expiration date |

Example #2: Data Validation

Suppose that a barcode 110 to be placed on a food item is encoded in accordance with the GS1 standard. Further suppose that when this barcode 110 is scanned, it produces the following decoded data 114:
010950110153000317150119 10AB-123

Further suppose that a grocery store would like to find out detailed information about this product. The data manipulation module 116 may perform GS1 validation 118c and output the following modified decoded data 122a:

| | | |
|---|---|---|
| (01-GTIN) | 09501101530003 | ←---- Global Trade Item Number |
| (17-USE BY) | Jan. 19, 2015 | |
| (10-BATCH/LOT) | AB-123 | |

Example #3: Data Formatting

Suppose that a company's receiving department wants to collect barcode data from all received items. Further suppose that only the first five characters of each item of barcode data are needed, and also that a separator "#" should be included between two items of data.

Suppose that the decoded data 114 is as follows:
64328hfdakshdkhfa
94375rhtwkndanklfd
12342uisajbfdksns The data manipulation module 116 may perform data formatting 120 in the manner described above and provide the following modified decoded data 122c:
64328#94375#12342

Example #4: Data Validation Followed by Data Formatting

Suppose that a state police department provides driver license scanners (barcode readers 102) for patrol police officers to collect limited personal data. Further suppose that there are two requirements for the data that is collected.

The first requirement is that the collected data should include the following fields: last name, first name, license number, date of birth, and expiration date. This requirement may be satisfied by performing data validation (specifically, parsing 118a).

The second requirement is that the data collected from a particular driver license should end with "- - - - - END - - - - -" to separate that data from the data associated with the next driver license that is scanned. This requirement may be satisfied by performing data formatting 120.

The two requirements discussed above can be satisfied by performing data validation (parsing 118a) followed by data formatting 120. However, in this example, the two requirements cannot be satisfied by performing data formatting 120 first followed by data validation.

After scanning two driver licenses, the data manipulation module 116 may output the following modified decoded data 122b:
LICENSE
SAMPLE
L252784655542
02-14-1965
11-20-2014
- - - - - END - - - - -
SAMPLE
JANICE
123456789
07-01-1957
07-01-2017
- - - - - END - - - - -

Figure 3:
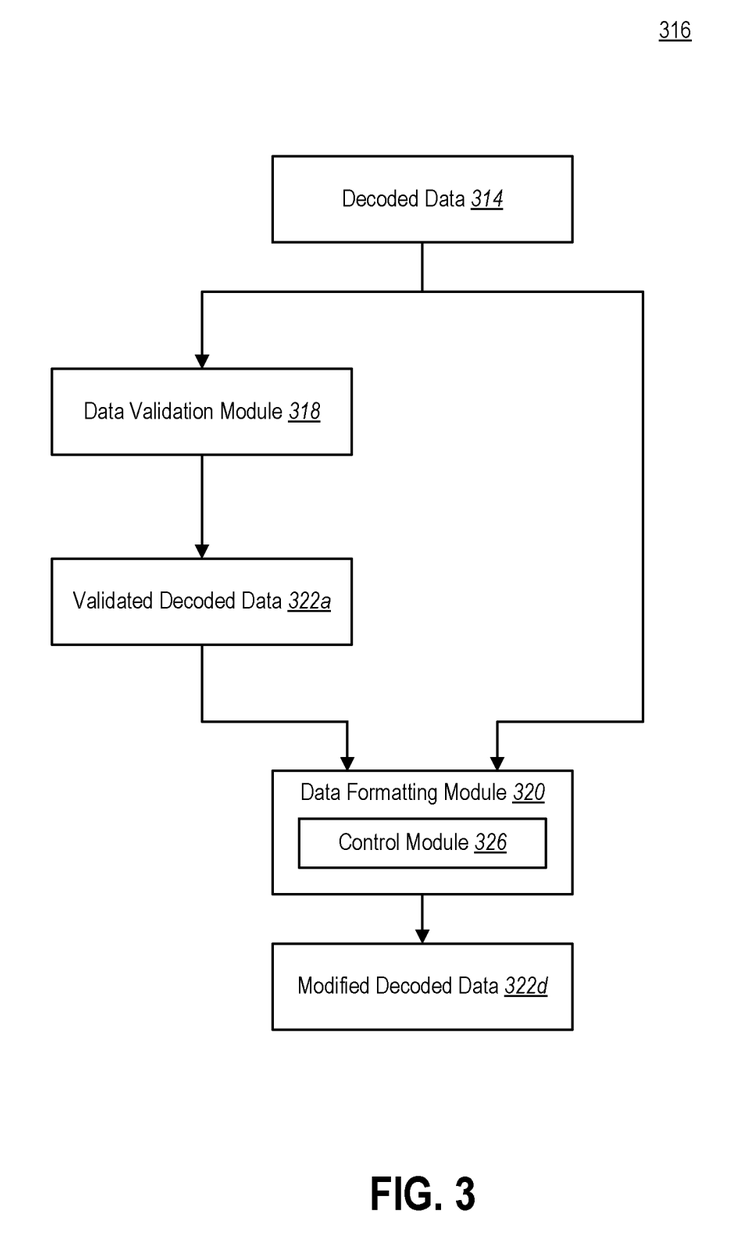
FIG. 3 illustrates an example of illustrates a design where a data manipulation module received decoded data and can perform either (1) data validation and data formatting or (2) only data formatting.

FIG. 3 illustrates a design where a data manipulation module 316 is capable of receiving decoded data 314 and performing either (1) data validation and data formatting or (2) only data formatting. The data manipulation module 316 includes a data validation module 318 and a data formatting module 320.

The data manipulation module 316 may be configured to receive the decoded data 314. The data manipulation module 316 may provide the decoded data 314 to both the data validation module 318 and the data formatting module 320.

The data validation module 318 may perform one or more data validation operations on the decoded data 314. The one or more data validation operations may include the operations performed by the data validation modules 118a-f shown in FIGS. 2A-C. The data validation module 318 may output validated decoded data 322a. The validated decoded data 322a may include one or more data validation modifications. Although not shown in FIG. 3, the data validation module 318 may be configured such that if one or more of the data validation operations performed on the decoded data 314 fail, the data validation module 318 outputs an error message or rejects the decoded data 314 and does not output any data.

The data formatting module 320 may be configured to perform one or more data formatting operations on incoming data and output resulting modified decoded data 322d. The data formatting module 320 may receive the validated decoded data 322a and may be capable of performing one or more data formatting operations on the validated decoded data 322a and outputting the result as the modified decoded data 322d. In that circumstance, the modified decoded data 322d may include data validation modifications and data formatting modifications. The data formatting module 320 may also receive the decoded data 314 and may also be capable of performing one or more data formatting operations on the decoded data 314 and outputting the result as the modified decoded data 322d. In this second circumstance, the modified decoded data 322d may include one or more data formatting modifications but not include any data validation modifications.

The data manipulation module 316 may include a control module 326. In FIG. 3, the data formatting module 320 includes the control module 326. In other designs, a control module may be separate from a data formatting module.

In some embodiments, the control module 326 may be configured to control whether the data formatting module 320 performs one or more data formatting operations on the validated decoded data 322a or the decoded data 314. For example, at a first time, the data formatting module 320 may have an option of performing one or more data formatting operations on the validated decoded data 322a or on the decoded data 314. The data formatting module 320 may perform one or more data formatting operations on the validated decoded data 322a based on input from the control module 326. Then, at a second time, the data formatting module 320 may again have an option of performing one or more data formatting operations on the validated decoded data 322a or on the decoded data 314. The data formatting module 320 may switch to perform one or more data formatting operations instead on the decoded data 314 based on input from the control module 326. In this example, at the first time, the data formatting module 320 may output a first modified decoded data that may include both data validation modifications and data formatting modifications. At the second time, the data formatting module 320 may output a second modified decoded data that may not include data validations and includes only data formatting modifications.

In other embodiments, the data formatting module 320 may perform one or more data formatting operations on the validated decoded data 322a, resulting in a first modified decoded data (not shown in FIG. 3), and also perform one or more data formatting operations on the decoded data 314, resulting in a second modified decoded data (not shown in FIG. 3). In such a configuration, the control module 326 may control whether the modified decoded data 322*d* output by the data formatting module 320 is the first modified decoded data or the second modified decoded data.

The control module 326 may receive instructions from the barcode reader 102 or the host computer 106 regarding whether the data formatting module 320 should perform one or more data formatting operations on the validated decoded data 322*a* or the decoded data 314. In other designs, the control module 326 may receive instructions from the barcode reader 102 or the host computer 106 regarding whether the data formatting module 320 outputs the first modified decoded data or the second modified decoded data as the modified decoded data 322*d*.

The control module 326 may also control whether the data validation module 318 performs one or more data validation operations on the decoded data 314.

Determining whether the modified decoded data 322*d* results from performing one or more data formatting operations on the validated decoded data 322*a* or on the decoded data 314 may depend on the relative importance of performance, battery conservation, accuracy, security, and fault tolerance. Determining whether the modified decoded data 322*d* results from performing one or more data formatting operations on the validated decoded data 322*a* or the decoded data 314 may also depend on characteristics of the barcode 110, needs of the one or more applications 108, and feedback from the host computer 106. The host computer 106 may use the computer communications module 330 to communicate needs of the one or more applications 108 and feedback to the communications module 328 of the barcode reader 102.

Thus, in accordance with the present disclosure, instead of embedding limited functionality of data formatting into various data parsing/validation configurations, the data formatting module 320 can be applied to either the decoded data 314 or the validated decoded data 322*a*. This makes formatting the validated decoded data 322*a* output more powerful and flexible, without adding complexity to the configuration for data parsing/validation.

Figure 4:
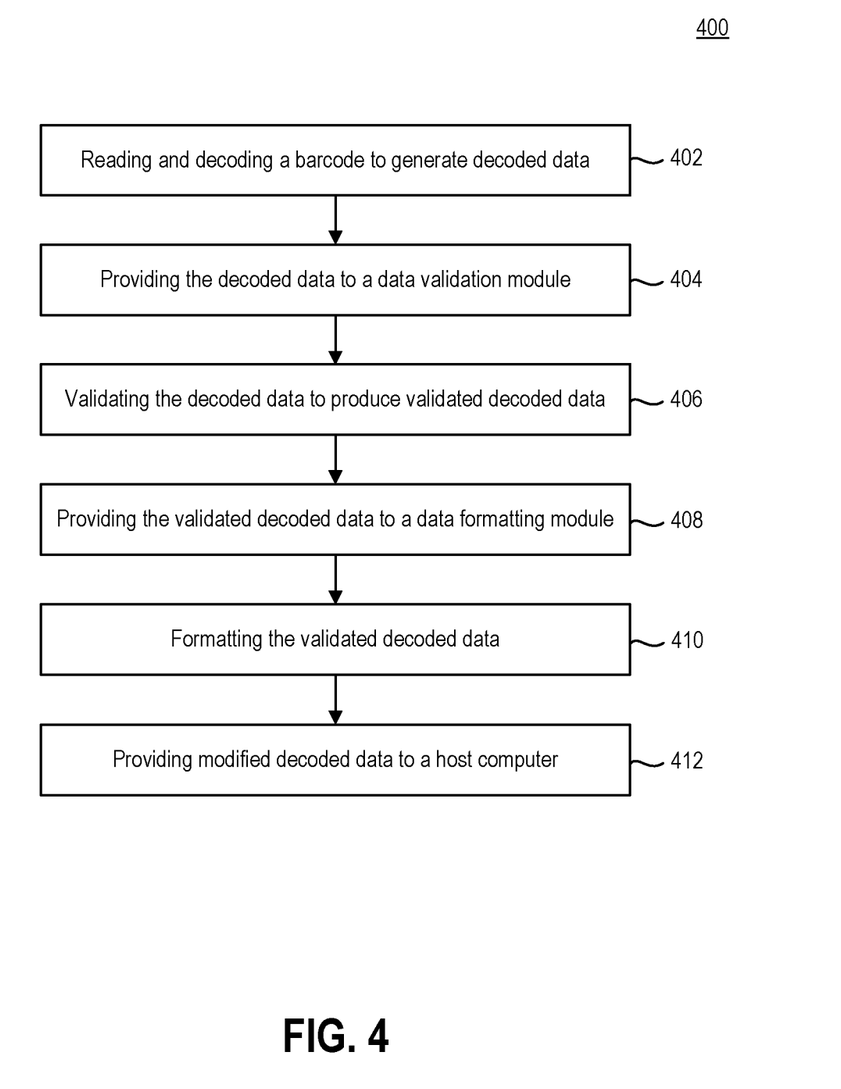
FIG. 4 illustrates an example method for validating and formatting decoded data.

FIG. 4 illustrates a method 400 for validating and formatting decoded data.

The method 400 may include reading and decoding 402 a barcode to generate decoded data. Reading and decoding the barcode may including using a barcode reader (such as the barcode reader 102 illustrated in FIG. 1) to capture an image of a barcode and using a barcode decoder (such as the barcode decoder 104 illustrated in FIG. 1) to generate the decoded data.

The method 400 may include providing 404 the decoded data to a data validation module. The data validation module may be capable of performing one or more data validation operations (such as validating, parsing, and matching).

The method 400 may include validating 406 the decoded data to produce validated decoded data. The validation module may perform the validation 406. Validating 406 may include performing one or more data validation operations on the decoded data. Validating 406 may include one or more of the following: determining whether the decoded data complies with an industry standard; determining whether the decoded data complies with one or more application requirements; parsing the decoded data in order to identify one or more fields contained therein; extracting information from the decoded data based on defined rules; or matching a string of characters in the decoded data to a defined pattern. The validated decoded data may include data validation modifications.

The method 400 may include providing 408 the validated decoded data to a data formatting module. The data formatting module may be capable of performing one or more data formatting operations. The data formatting module may be capable of formatting the validated decoded data. The data formatting module may also be capable of formatting the decoded data.

The method 400 may include formatting 410 the validated decoded data. Formatting 410 the validated decoded data may be done with the data formatting module and may produce modified decoded data. Formatting 410 the validated decoded data may include the data formatting module performing one or more data formatting operations on the validated decoded data. Formatting 410 the validated decoded data may include one or more of deleting one or more characters from the decoded data; adding one or more additional characters to the decoded data; changing the decoded data to a different type of numeral system; or changing at least some characters in the decoded data to a different letter case. The modified decoded data may include data validation modifications and data formatting modifications. The modified decoded data may include less than all the decoded data and at least one additional character.

The method 400 may include providing 412 modified decoded data to a host computer. The host computer may provide the modified decoded data to one or more applications, which may use the modified decoded data to perform one or more operations. The one or more operations may depend on the modified decoded data including data validation modifications and data formatting modifications.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the terms "coupled" and "connected" refer to components being in electrical communication with each other and/or mechanically affixed to each other, depending on the context, whether directly (i.e., without any intermediate components) or indirectly (i.e., via one or more intermediate components).

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode reading system, comprising:
    a barcode reader configured to read and decode a barcode to generate decoded data; and
    a non-transitory processor-readable storage medium comprising instructions that, when executed by at least one processor, cause the at least one processor to:
        perform one or more data validation operations on the decoded data to produce validated decoded data;
        determine whether to perform one or more data formatting operations on the validated decoded data or on the decoded data; and
        perform the one or more data formatting operations on either the validated decoded data or the decoded data based on the determination.

2. The barcode reading system of claim 1, wherein the instructions, when executed by the at least one processor, cause the at least one processor to perform any of:
    (i) data validation followed by data formatting; or
    (ii) data formatting without data validation.

3. The barcode reading system of claim 1, wherein the one or more data validation operations comprise at least one of:
    determining whether the decoded data complies with an industry standard;
    determining whether the decoded data complies with one or more application requirements;
    parsing the decoded data in order to identify one or more fields contained therein;
    extracting information from the decoded data based on defined rules; or
    matching a string of characters in the decoded data to a defined pattern.

4. The barcode reading system of claim 3, wherein the industry standard is at least one of:
    a GS1 standard;
    a Unique Device Identification standard;
    an International Organization for Standardization standard; or
    an American Association of Motor Vehicle Administrators standard.

5. The barcode reading system of claim 1, wherein the validated decoded data includes one or more data validation modifications.

6. The barcode reading system of claim 1, wherein the one or more data formatting operations comprise at least one of:
    deleting one or more characters from the decoded data;
    adding one or more additional characters to the decoded data;
    changing the decoded data to a different type of numeral system; or
    changing at least some characters in the decoded data to a different letter case.

7. The barcode reading system of claim 1, wherein the barcode reader comprises the non-transitory processor-readable storage medium.

8. The barcode reading system of claim 1, wherein:
    the barcode reading system further comprises a host computer that is in electronic communication with the barcode reader; and
    the host computer comprises the non-transitory processor-readable storage medium.

9. The barcode reading system of claim 1, wherein the modified decoded data comprises less than all the decoded data and at least one additional character.

10. A method, comprising:
    reading and decoding a first barcode to generate first decoded data;
    reading and decoding a second barcode to generate second decoded data;
    providing the first decoded data to a data validation module;
    validating, with the data validation module, the first decoded data to produce validated first decoded data;
    providing the validated first decoded data to a data formatting module;
    providing the second decoded data to the data formatting module without validating the second decoded data;
    formatting, with the data formatting module, the validated first decoded data to produce modified validated first decoded data; and
    formatting, with the data formatting module, the second decoded data to produce modified second decoded data.

11. The method of claim 10, wherein validating, with the data validation module, the first decoded data includes at least one of the following:
    determining whether the first decoded data complies with an industry standard;
    determining whether the first decoded data complies with one or more application requirements;
    parsing the first decoded data in order to identify one or more fields contained therein;
    extracting information from the first decoded data based on defined rules; or
    matching a string of characters in the first decoded data to a defined pattern.

12. The method of claim 10, wherein formatting, with the data formatting module, the validated first decoded data or the second decoded data includes at least one of:
    deleting one or more characters from the validated first decoded data or the second decoded data;
    adding one or more additional characters to the validated first decoded data or the second decoded data;
    changing the validated first decoded data or the second decoded data to a different type of numeral system; or
    changing at least some characters in the validated first decoded data or the second decoded data to a different letter case.

13. The method of claim 10, further comprising providing the modified validated first decoded data or the modified second decoded data to a host computer.

14. The method of claim 10, wherein the modified second decoded data comprises less than all the second decoded data and at least one additional character.

15. A non-transitory processor-readable storage medium comprising instructions that, when executed by at least one processor, cause a barcode reader to:
- perform a first set one or more data formatting operations on decoded data generated from decoding a barcode to produce modified decoded data;
- perform one or more data validation operations on the decoded data generated from decoding the barcode without performing one or more data formatting operations on the decoded data to produce validated decoded data;
- perform a second set of one or more data formatting operations on the validated decoded data to produce modified validated decoded data; and
- output one of the modified validated decoded data or the modified decoded data.

16. The non-transitory processor-readable storage medium of claim 15, wherein the instructions, when executed by the at least one processor, further cause the barcode reader to determine whether to output the modified validated decoded data or the modified decoded data.

17. The non-transitory processor-readable storage medium of claim 15, wherein the one or more data validation operations comprise at least one of:
- determining whether the decoded data complies with an industry standard;
- determining whether the decoded data complies with one or more application requirements;
- parsing the decoded data in order to identify one or more fields contained therein;
- extracting information from the decoded data based on defined rules; or
- matching a string of characters in the decoded data to a defined pattern.

18. The non-transitory processor-readable storage medium of claim 17, wherein the industry standard is at least one of:
- a GS1 standard;
- a Unique Device Identification standard;
- an International Organization for Standardization standard; or
- an American Association of Motor Vehicle Administrators standard.

19. The non-transitory processor-readable storage medium of claim 15, wherein the validated decoded data includes one or more data validation modifications.

20. The non-transitory processor-readable storage medium of claim 15, wherein the first set of one or more data formatting operations and the second set of one or more data formatting operations comprise at least one of:
- deleting one or more characters from the decoded data;
- adding one or more additional characters to the decoded data;
- changing the decoded data to a different type of numeral system; or
- changing at least some characters in the decoded data to a different letter case.

\* \* \* \* \*